Patented May 9, 1939

2,157,362

UNITED STATES PATENT OFFICE 2,157,362

PROCESS OF PRODUCING URETHANE SUBSTANCES CONTAINING CARBOXYL OR SULPHONIC ACID GROUPS

Heinrich Ulrich and Paul Koerding, Ludwigshafen-on-the-Rhine, Germany, assignors to I. G. Farbenindustrie Aktiengesellschaft, Frankfort-on-the-Main, Germany No Drawing. Application November 3, 1936, Serial No. 108,976. In Germany November 8, 1935

14 Claims. (Cl. 260—100)

The present invention relates to a process of producing urethane substances containing carboxyl or sulphonic acid groups.

United States Patent 1,933,945 relates to a process for the production of urethane substances suitable as assistants for the textile and allied industries which comprises reacting an aliphatic amino acid containing at least one hydrogen atom connected to a nitrogen atom with a chlorocarbonic ester of an aliphatic alcohol in which the carbon atom bearing hydroxyl group is directly connected to at least one hydrogen atom.

We have now found that particularly valuable urethanes containing at least one carboxylic or sulphonic acid group can be obtained by causing aminocarboxylic acids or aminosulphonic acids to react with chlorocarbonic acid esters from resin alcohols or the substitution products thereof. The resin alcohols can be obtained from resinous acids, as for example colophony, scrape resin and the like, or pure abietic acid, copalic acids and the like, either by catalytic reduction or by reduction with sodium and alcohol, or in any other appropriate manner. The chlorocarbonic acid esters of abietinol, di- or tetrahydroabietinol and the like are particularly suitable for the present process. The said chlorocarbonic acid esters may also contain substituents in the nuclei of the resin alcohol, as for example halogen atoms, nitro groups and the like.

Aminocarboxylic acids or aminosulphonic acids suitable for the condensation are, for example, glycocoll, N-hydroxyethylaminoacetic acid, alanine, sarkosine, aminoethanesulphonic acid (taurine), N-methylaminoethanesulphonic acid, N-hydroxyethylaminosulphonic acid, aminopropansulphonic acid, monoethanolamine- or ethylbutanol aminesulphuric acid esters, degradation products of albumen and the like. The carbon chains of the alkyl radicles of the said compounds may also be interrupted by hetero atoms or groups containing hetero atoms as for example oxygen or sulphur atoms or —NH—,

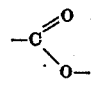

or

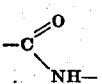

groups. Aromatic, heterocyclic or cycloaliphatic aminocarboxylic acids or aminosulphonic acids, such as p-aminobenzoic acid or sulphanilic acid, may also be employed as initial material in the present process.

The condensation of the chlorocarbonic acid esters of resin alcohols with the amino acids is preferably effected in an aqueous-alkaline medium. It is advantageous to add before the condensation to the aqueous-alkaline solution of the amino acid a slight amount of a dispersing agent which under the working conditions does not react with the initial materials, because in this case the chlorocarbonic acid esters of the resin alcohols which have a comparatively viscous consistency are rapidly dispersed in the solution and react with the amino acids without the undesired side-reactions. In the said manner urethanes having the following constitution are obtained:

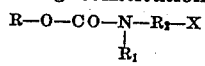

wherein R stands for the radicle of a resin alcohol, R₁ stands for hydrogen or any desired organic radicle, R₂ stands for an organic radicle and X means at least one carboxylic or sulphonic acid group.

The condensation products obtained in the manner described are usually highly soluble in water; after drying they show a good sticking power, like the insoluble resinous acids. If the reaction products are not or only insufficiently soluble in water, they can be rendered soluble in water by the treatment with sulphonating agents, such as concentrated sulphuric acid, oleum, chlorosulphonic acid and the like, if desired in solution with inert organic solvents. It is also possible to react chlorocarbonic acid esters of resin alcohols with amines which are free from acid groups, but which are easily sulphonatable and to sulphonate the insoluble urethanes which become in this manner soluble in water. For their property of going on to animal or vegetable fibrous materials from dilute aqueous solutions, the said products can be used with advantage for the treatment of textiles, paper and the like to impart to these materials sticking properties or a full touch.

The following examples will further illustrate how the present invention will be carried out in practice, but the invention is not restricted to these examples. The parts are by weight.

*Example 1*

115 parts of the chlorocarbonic acid ester of abietinol are allowed at between 30° and 35° C. while stirring to flow into a solution of 41 parts of the sodium salt of sarkosine, 12 parts of caustic soda and 3 parts of the reaction product of 20 molecular proportions of ethylene oxide with 1 molecular proportion of oleyl alcohol in 210 parts of water. As soon as the condensation is finished, the reaction mixture is allowed to settle, the salt solution which separates on the bottom is filtered off by suction and the whole is made up to 580 parts by the addition of water. The yellow viscous solution formed contains a urethane of the following constitution:

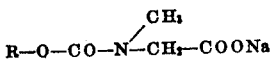

wherein R represents an abietyl radicle. The product obtained is clearly soluble in warm water and has good sticking properties.

Example 2

220 parts of 20 per cent sodium salt of N-methyltaurine, 35 parts of 35 per cent caustic soda solution and 50 parts of a 40 per cent solution of the reaction product of 10 molecular proportions of ethylene oxide with 1 molecular proportion of lauryl alcohol are mixed with one another in a stirring vessel. 115 parts of the chlorocarbonic acid ester of abietinol are allowed to flow into this mixture at about 35° C. and then the whole is heated to 50° C. for a short time. The reaction mixture is then adjusted to neutral reaction by the addition of dilute sulphuric acid, and any salt solution formed is removed by decanting. A highly viscous solution is obtained which contains the sodium salt of a urethane of the following constitution:

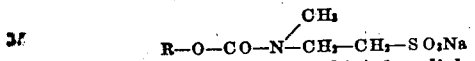

wherein R stands for an abietyl radicle.
The product has sticking properties.

Example 3

115 parts of the chlorocarbonic acid ester of abietinol are caused to run at 40° C. into a solution of 50 parts of the sulphuric acid ester of ethanol amine and 24 parts of caustic soda in 140 parts of water. In order to complete the reaction the mixture is heated for 30 minutes at 50° C. After cooling a small amount of salt water which separates is removed by decanting. A colorless aqueous paste is obtained which as an effective constituent contains a urethane of the following formula:

wherein R stands for an abietyl radicle.
It is preferable to add to the reaction mixture, prior to the condensation, as dispersing agent about 50 parts of a product which has already been prepared in a preceding operation, since in this case the reaction proceeds particularly uniformly.

What we claim is:

1. The process of producing urethane substances suitable as assistants in the textile and related industries containing at least one acid group which comprises causing an amino acid containing an acid group selected from the class consisting of carboxylic, sulphonic and sulphuric ester groups containing at least one hydrogen atom connected to a nitrogen atom to react with a chlorocarbonic acid ester of an alcohol selected from the class consisting of resin alcohols and hydrogenated resin alcohols produced by the carboxylic reduction of natural resin acids.

2. The process of producing urethane substances suitable as assistants in the textile and related industries containing at least one acid group which comprises causing an aliphatic amino acid containing an acid group selected from the class consisting of carboxylic, sulphonic and sulphuric ester groups containing at least one hydrogen atom connected to a nitrogen atom to react with a chlorocarbonic acid ester of an alcohol selected from the class consisting of resin alcohols and hydrogenated resin alcohols produced by the carboxylic reduction of natural resin acids.

3. The process of producing urethane substances suitable as assistants in the textile and related industries containing at least one acid group which comprises causing an aliphatic amino acid containing an acid group selected from the class consisting of carboxylic, sulphonic and sulphuric ester groups containing at least one hydrogen atom connected to a nitrogen atom to react in an alkaline medium with a chlorocarbonic acid ester of an alcohol selected from the class consisting of resin alcohols and hydrogenated resin alcohols produced by the carboxylic reduction of natural resin acids.

4. The process of producing urethane substances suitable as assistants in the textile and related industries containing at least one acid group which comprises causing an aliphatic amino acid containing an acid group selected from the class consisting of carboxylic, sulphonic and sulphuric ester groups containing at least one hydrogen atom connected to a nitrogen atom to react in an alkaline medium with a chlorocarbonic acid ester of an alcohol selected from the class consisting of resin alcohols and hydrogenated resin alcohols produced by the carboxylic reduction of natural resin acids while adding a dispersing agent.

5. The process of producing urethane substances suitable as assistants in the textile and related industries containing at least one acid group which comprises causing an aliphatic amino acid containing an acid group selected from the class consisting of carboxylic, sulphonic and sulphuric ester groups containing at least one hydrogen atom connected to a nitrogen atom to react in an alkaline medium at slightly elevated temperature with a chlorocarbonic acid ester of an alcohol selected from the class consisting of resin alcohols and hydrogenated resin alcohols produced by the carboxylic reduction of natural resin acids.

6. The process of producing urethane substances suitable as assistants in the textile and related industries containing at least one acid group which comprises causing a low molecular aliphatic amino carboxylic acid containing at least one hydrogen atom connected to a nitrogen atom to react in an alkaline medium with a chlorocarbonic acid ester of an alcohol selected from the class consisting of resin alcohols and hydrogenated resin alcohols produced by the carboxylic reduction of natural resin acids.

7. The process of producing urethane substances suitable as assistants in the textile and related industries containing at least one acid group which comprises causing sarkosine to react in an alkaline medium with a chlorocarbonic acid ester of an alcohol selected from the class consisting of resin alcohols and hydrogenated resin alcohols produced by the carboxylic reduction of natural resin acids.

8. The process of producing urethane substances suitable as assistants in the textile and related industries containing at least one acid group which comprises causing a low molecular aliphatic aminosulphonic acid containing at least one hydrogen atom connected to a nitrogen atom to react in an alkaline medium with a chlorocarbonic acid ester of an alcohol selected from the class consisting of resin alcohols and hydrogenated resin alcohols produced by the carboxylic reduction of natural resin acids.

9. The process of producing urethane substances suitable as assistants in the textile and related industries containing at least one acid group which comprises causing an amino ethane sulphonic acid containing at least one hydrogen atom connected to a nitrogen atom to react in an alkaline medium with a chlorocarbonic acid ester of an alcohol selected from the class consisting of resin alcohols and hydrogenated resin alcohols produced by the carboxylic reduction of natural resin acids.

10. A urethane substance suitable as assistant in the textile and related industries corresponding to the formula

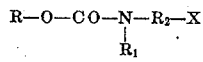

wherein R stands for the radicle of an alcohol selected from the class consisting of resin alcohols and hydrogenated resin alcohols produced by the carboxylic reduction of natural resin acids, $R_1$ is a member of the group consisting of a hydrogen atom and a lower alkyl radicle, $R_2$ stands for a low molecular organic radicle and X represents a member of the group consisting of the carboxylic group, the sulphonic acid and the sulphuric acid ester group.

11. A urethane substance suitable as assistant in the textile and related industries corresponding to the formula

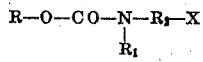

wherein R stands for the radicle of abietyl alcohol, $R_1$ is a member of the group consisting of hydrogen and a low molecular alkyl radicle, $R_2$ stands for an alkylene radicle and X represents a member of the group consisting of the carboxylic group, the sulphonic acid and the sulphuric acid ester group.

12. A urethane substance suitable as assistant in the textile and related industries corresponding to the formula

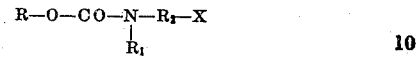

wherein R stands for the radicle of dihydro abietyl alcohol, $R_1$ is a member of the group consisting of hydrogen and a low molecular alkyl radicle, $R_2$ stands for an alkylene radicle and X represents a member of the group consisting of the carboxylic group, the sulphonic acid and the sulphuric acid ester group.

13. A urethane substance suitable as assistant in the textile and related industries corresponding to the formula

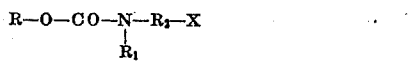

wherein R stands for the radicle of abietyl alcohol, $R_1$ is a member of the group consisting of hydrogen and a methyl group, $R_2$ stands for an ethylene group and X is a carboxylic group.

14. A urethane substance suitable as assistant in the textile and related industries corresponding to the formula

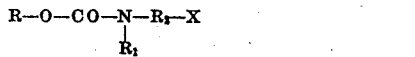

wherein R stands for the radicle of abietyl alcohol, $R_1$ is a member of the group consisting of hydrogen and a methyl group, $R_2$ stands for an ethylene group and X is a sulphuric acid ester group.

HEINRICH ULRICH.
PAUL KOERDING.